Nov. 7, 1961 A. A. GREGORY 3,008,074
ELECTRIC MOTOR CONTROL
Filed April 20, 1956 2 Sheets-Sheet 1

INVENTOR
Alfred Alexander Gregory
By Morris & Bateman
ATTORNEYS

United States Patent Office 3,008,074
Patented Nov. 7, 1961

3,008,074
ELECTRIC MOTOR CONTROL
Alfred Alexander Gregory, Chorlton-Cum-Hardy, Manchester, England, assignor to Metropolitan-Vickers Electrical Company Limited, London, England, a British company
Filed Apr. 20, 1956, Ser. No. 579,654
Claims priority, application Great Britain Apr. 27, 1955
4 Claims. (Cl. 318—264)

This invention relates to the control of electric motors and aims at an improved means for automatically stopping and reversing the motor in dependence upon a predetermined motor torque. While similar means have been known before in connection with special equipment, the invention aims at an improved arrangement having the following advantages:

(a) The equipment is robust and sensitive;
(b) It can consist of comparatively simple and readily available components such as relays of post office type, and a conventional type ammeter with relay contacts;
(c) The "cut out" current fed to the motor can be readily set as desired for the particular operation;
(d) The changing magnitude of the motor current can be easily observed.

Although not so limited, one important application of the present invention is in conjunction with expander tools which are usually employed for rolling the ends of heater and condenser tubes into the tube plate holes. In this application it is desirable that the exact value of a predetermined maximum expanding torque is exerted when each tube end is thus secured into the tube plates of the condenser or heater, in order to ensure uniform, leak proof joints with the minimum of cold working of the material of the tubes. Obviously when used for expander operation the invention makes it possible to replace the element of human judgment by automatic control, and to reduce or eliminate irregularities due to human error.

From a general aspect the main object of the invention resides in a circuit arrangement which is actuated by a single switch, preferably of a trigger type, which circuit is utilised for starting a motor, automatically stopping it when the motor current reaches a predetermined value, and then automatically reversing the motor a short lapse of time after the said stoppage.

In a preferred embodiment according to the invention, an additional device such as a push button switch can also be provided to permit reversal of the motor in special circumstances and independently of the automatic reversal referred to above.

Figure 1:
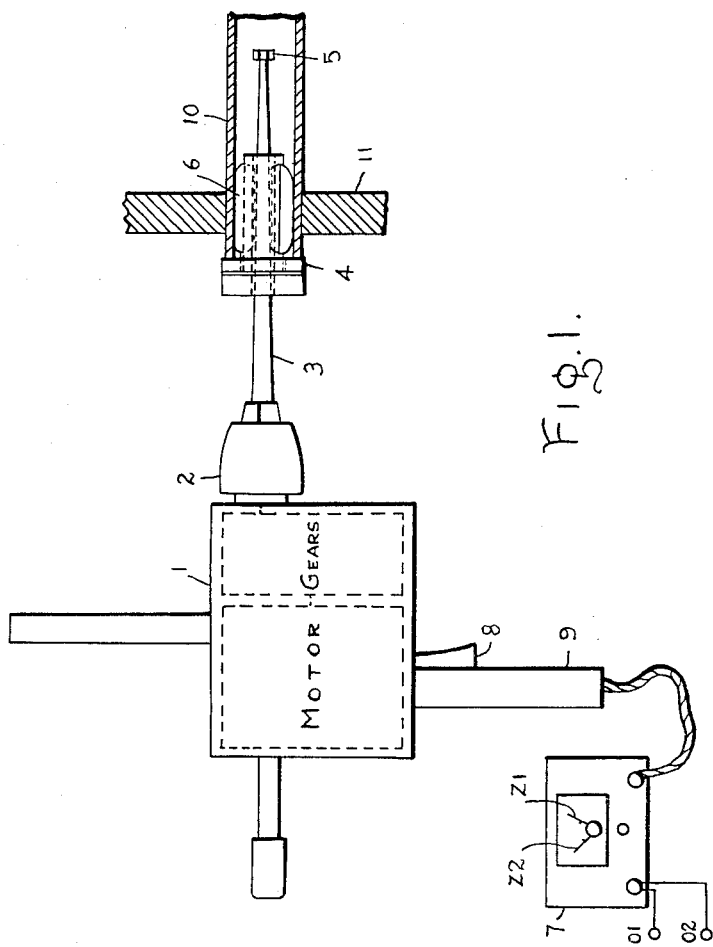
Figure 2:
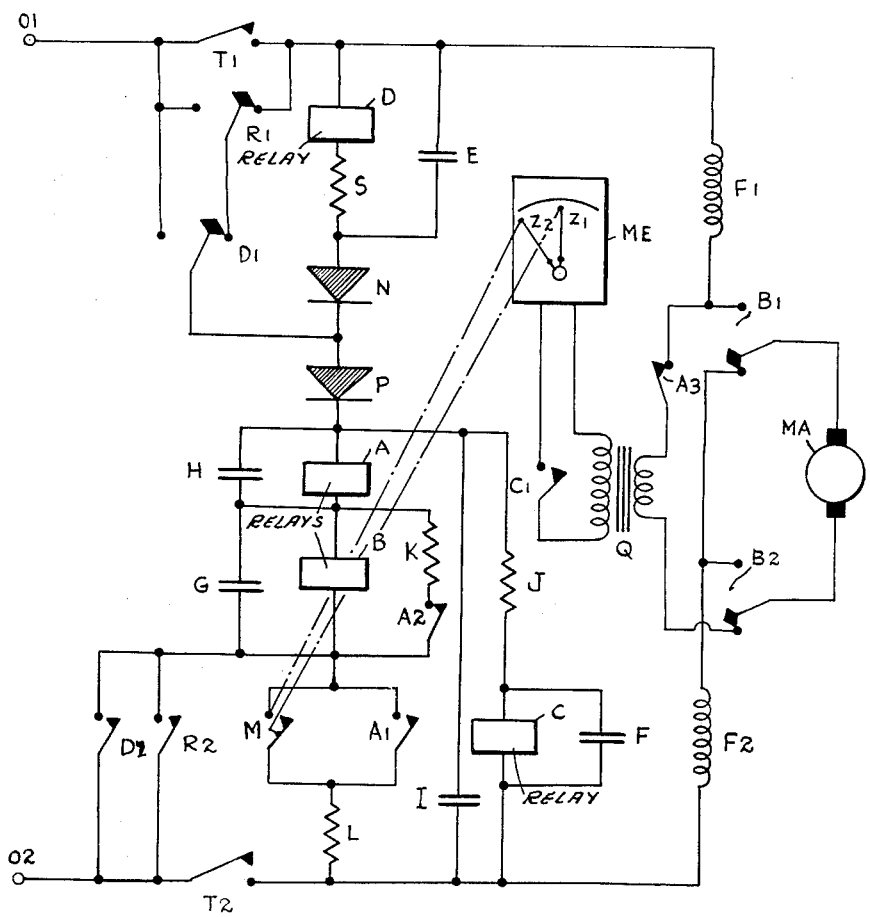

As the use in conjunction with expander tools is one important application of the invention, the following description thereof considers in detail this application, with reference to the accompanying drawings, in which:

FIG. 1 shows diagrammatically an expander tool including the invention; and
FIG. 2 shows a preferred embodiment of the electric circuit arrangement according to the invention.

As can be seen from FIG. 1 the mechanical part of the tool comprises a portable electric motor which can be of any suitable design, and is accommodated in a casing 1 together with a reduction gear for driving via a chuck 2 a tapered shaft 3 which carries the expander head and at its outer end a stop nut 5. The expander head includes a stop ring 4 and an arrangement of tapered rollers 6, and is axially movable along the shaft 3 between the chuck and stop nut 5. The motor is connected to a power current supply by terminals O1, O2 via a control box 7 which houses electric control elements including a meter having a settable pointer Z1. The setting of this pointer determines the value at which automatic reversal of the motor is required and an indicating pointer Z2 is provided to afford an indication of the electric quantity which is a measure of the motor torque, and therefore varies during operation of the expander. The start of the whole operation is controlled by a single switch having an actuating element 8 of trigger fashion protruding from a handle 9 of the casing 1.

By means of the above described tool the following mechanical operation can be carried out in order to expand a tube end and secure it to a tube plate. First the expander head comprising the tapered roller arrangement 6 is pushed towards the lesser end of the shaft 3 until it abuts the stop nut 5. The head is then inserted in the tube to be expanded until the stop ring 4 abuts the end of the tube. An axial pressure is applied and the trigger switch is pressed to start the motor which drives the tapered shaft. As the tapered shaft moves axially relative to the expander head, the effective diameter of the tapered roller arrangement increases, thereby causing expansion of the tube end. The increasing opposing torque causes an increase in the motor current, which is used to stop and reverse the motor automatically when the current, which is a measure of the torque, and therefore of the expansion achieved under given conditions, has reached a predetermined value. The manner in which this is effected by the automatic electric control of this invention, the circuit components required and their interconnection, will now be described with reference to FIG. 2.

At rest all contacts are as shown in the diagram.

*Forward operation (expansion)*

On pressing a starting switch as the trigger switch 8 shown in FIG. 1 and electrically incorporated in the motor circuit, contacts T1 and T2 close. Current flows from terminal O1 via T1, field winding F1 of the motor, contact A3, which is closed, primary winding of a current transformer Q, closed contact B2, armature winding MA of the motor, closed contact B1, field winding F2 of the motor, and closed contact T2 to terminal O2, the terminals O1 and O2 being connected to a suitable supply such as an alternating current mains.

Simultaneously, current also flows through a second branch, namely, from terminal O1 via closed contacts T1, R1, D1, rectifier P, resistor J, relay coil C, and closed contact T2 to terminal O2. This branch current, rectified by P, and preferably smoothed by the action of a capacitor I provided in shunt to resistor J and relay coil C operates relay coil C after a short time delay determined by the charging time of a delay capacitor F connected across the relay coil C. The operation of coil C closes a contact C1 in the circuit of an ammeter ME connected to a secondary winding of transformer Q. Thus after the starting surge has subsided the meter will indicate the increasing motor current which is a measure of the increasing torque.

*Cut out*

The motor current is caused to increase by the increasing opposing torque until it reaches a predetermined value depending on the required maximum torque. A manually adjustable setting device such as pointer Z1 is provided on the meter to be preset before the operation starts, so that when the maximum torque is reached, the two pointers Z1, Z2 coincide. At this instant a pair of contacts M connected respectively to the pointers is caused to close, thus allowing a flow of direct current from the rectifier P through the energising coils of stopping and reversing relays A and B, and through a resistor L.

When stopping relay A operates, after a short time delay (approximately ⅕ second), determined by the charging period of a relay capacitor H, a contact A3 in the motor circuit opens to interrupt the flow of motor current and stop the motor. When operated relay A also causes closure of a contact A1 so that the energising coil of A remains excited after contact M has opened due to the interruption of the motor current. Relay A also causes a contact A2 to open thus to enable charging up of a delay capacitor G, and thereupon energisation of reversing relay B.

*Automatic reverse operation*

Relay B operates after a time delay of the order of two seconds for instance which is determined by the value of capacitor G, and is selected to permit the motor to come to rest before it is automatically switched in reverse. This delay also allows time for the operator to brace himself to resist a torque in the opposite direction. When relay B is energised, as above, contacts B1 and B2 of the switch over type are operated so that the armature connections are reversed and current then flows from terminal O1 through T1, field winding F1, contact B1, motor armature winding MA, contact B2, field winding F2 and contact T2 to terminal O2.

Throughout the above operations the operator presses the trigger to keep contacts T1 and T2 closed. On releasing the trigger all relays and contacts are reset ready for forward operation. It will be noted that the meter is not in circuit during reverse operation of the motor.

*Manual reverse operation*

By the automatic operation as described above, the motor is set for reverse only after a predetermined current value has been reached during forward operation. As it is sometimes desired to start the motor in reverse, an additional manual control can be provided. It comprises a switch such as a push-button (not shown) which, on being pressed, reverses contacts R1 and closes a contact R2.

The trigger switch 8 is not operated now and current flows from terminal O1 through contacts R1, D1, a rectifier N, a resistor S, the energising coil of a relay D, the field winding F1, contact A3, primary winding of transformer Q, contact B2, motor armature MA, contact B1, field winding F2, resistor L, contact A1 (which closes when the push-button is pressed as described below), and contact R2 to terminal O2. The impedance of this circuit is so selected that the rectifier current is very small and will not operate the motor but will operate relay D, a capacitor E being connected across the coil of relay D and resistor S to smooth the rectified current. When relay D operates, it reverses contacts D1 which are of the change over type and closes contact D2, thus bypassing the contacts R1 and R2 on the push-button.

At the same time, current flows through contact D1, rectifier P, relay A and relay B to contact D2, thus operating both relays A and B and closing contact A1, opening contacts A2 and A3 and reversing contacts B1 and B2 ready for reverse operation.

If the trigger switch is pressed contacts T1 and T2 admit again the full current to the motor which now operates in reverse. At the same time contact T1, in closing, bypasses D1, N, S and D and causes relay D to release and reset contacts D1 and D2 to the "rest" position. When the trigger switch is released, relays A and B are also released ready for forward operation.

It will be understood that details of the construction and circuit arrangement shown can be adapted for different applications and can be varied to meet individual requirements, and that an arrangement according to the invention can be combined with any suitable and desired means which are known per se, without departing from the scope and spirit of the present invention.

What I claim is:
1. A reversible drive comprising an alternating current motor having an armature and series field windings, reversing contacts between the armature and field windings of the motor, a stopping contact in the motor supply circuit, an ammeter having a settable contact to close a circuit when the current measured by the ammeter attains a predetermined value, a transformer having its primary winding connected in series with said stopping contact and its secondary winding connected to the measuring circuit of the ammeter, a delay contact in the secondary winding of said transformer, a direct current electromagnetic reversing relay for operating the reversing contacts, a direct current electromagnetic stopping relay for operating the said stopping contact, and a direct current delaying relay for operating the delay contact, a parallel circuit connected in parallel to the motor circuit to be supplied from the same source as the motor and including the operating coils of said relays in series with rectifying means, a capacitor connected in parallel to each one of the operating coils of the said relays to introduce delay characteristics, automatic switching means in said motor and parallel circuits, and a manual switch for operating the said switching means thereby to start an operating cycle monitored automatically by the said relays and ammeter, so as to start the motor in forward direction while said delay contact is open for a short initial period to prevent the starting current of the motor from influencing the ammeter action, then to operate the said stopping contact for disconnecting the motor when the motor current attains a predetermined value, as set in the ammeter, and to operate the reversing contacts after the operation of the stopping contact, the interval between the two operations allowing the motor to decelerate after disconnection before reconnection for reversed rotation.

2. The system as defined in claim 1, wherein said rectifier means constitutes a common rectifier for supplying a direct current energizing circuit to said relays.

3. The system as defined in claim 1, wherein means are provided for manually reversing the rotation of said motor.

4. A reversible electric motor control system comprising an alternating current motor having a circuit including an armature and field windings connected in series with said armature, reversing switch means in said circuit between the armature and field windings, a normally closed motor cut-off switch in said circuit, a current measuring meter, a settable contact switch adapted to close when the current through the meter reaches an amount determined by the switch contact setting, a transformer having its primary winding in said motor circuit in series with said cut-out switch and its secondary wnding connected in circuit to energize said meter, a meter switch in said secondary winding circuit, a direct current electromagnetic relay operatively connected to said reversing switch means, a direct current electromagnetic relay operatively connected to said motor cut-out switch, a relay circuit connected in parallel to said motor circuit and comprising current rectifying means connected to supply direct current to two branch circuits one containing the operating coils of said electromagnetic relays and said settable contact motor switch and the other containing a delay relay connected to close said meter switch a predetermined time after the motor circuit is energized, capacitors connected in parallel to the operating coils of each of said relays to introduce delay characteristics, a common alternating current supply circuit for both the motor and relay circuits, and a manually controlled switch in the supply circuit whereby when said manual switch is closed the motor armature and field windings are energized to start the motor in its forward direction and after a predetermined delay to protect the meter against the motor starting current the delay relay closes said meter switch, said settable contact meter switch closing when a predetermined current flows in said secondary winding and thereby enabling current flow through said one branch circuit to sequentially interrupt and then reverse the motor circuit.

References Cited in the file of this patent

UNITED STATES PATENTS

| | | |
|---|---|---|
| 1,924,459 | Ryder | Aug. 29, 1933 |
| 2,535,782 | Carlson | Dec. 26, 1950 |
| 2,767,462 | Mathews | Oct. 23, 1956 |